United States Patent
MacCarthaigh et al.

(10) Patent No.: US 11,397,652 B2
(45) Date of Patent: *Jul. 26, 2022

(54) MANAGING PRIMARY REGION AVAILABILITY FOR IMPLEMENTING A FAILOVER FROM ANOTHER PRIMARY REGION

(71) Applicant: Amazon Technologies, Inc., Seattle, WA (US)

(72) Inventors: Colm MacCarthaigh, Seattle, WA (US); Nathan Dye, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,350

(22) Filed: Mar. 27, 2020

(65) Prior Publication Data
US 2021/0303423 A1  Sep. 30, 2021

(51) Int. Cl.
G06F 11/20 (2006.01)

(52) U.S. Cl.
CPC ...... *G06F 11/2025* (2013.01); *G06F 2201/85* (2013.01)

(58) Field of Classification Search
CPC ............... G06F 11/202; G06F 11/2023; G06F 11/2025; G06F 11/2028; G06F 11/203;
(Continued)

(56) References Cited

U.S. PATENT DOCUMENTS 6,865,591 B1  3/2005  Garg
8,595,547 B1  11/2013  Sivasubramanian
(Continued)

FOREIGN PATENT DOCUMENTS

WO   WO 2021/108452   6/2021
WO   WO 2021/195392   9/2021

OTHER PUBLICATIONS

Zhou et al., "Cloud Service Reliability Enhancement via Virtual Machine Placement Optimization", 2017, IEEE Transactions on Services Computing, pp. 902-913 (Year: 2017).*
(Continued)

*Primary Examiner* — Gabriel Chu
(74) *Attorney, Agent, or Firm* — Knobbe, Martens, Olson & Bear, LLP

(57) ABSTRACT

The present disclosure generally relates to managing a failover service. The regional management service can receive a list of primary regions and a list of rules for each primary region that must be satisfied for a primary region to be considered available for failover from the respective primary region. The regional management service can then determine the primary regions that satisfy each rule of the list of rules for one or more primary regions and are available for failover of the respective primary regions. The regional management service can then deliver this information to a client. The regional management service can determine the primary regions that do not satisfy one or more of the rules from the list of rules for one or more primary regions and deliver this information to a client. The regional management service can perform automatic remediation and client remediation to the unavailable primary regions.

20 Claims, 6 Drawing Sheets

(58) Field of Classification Search
CPC ............ G06F 11/2033; G06F 11/2035; G06F 11/2041; G06F 11/3442; H04L 41/0668; H04L 41/0663; H04L 67/1008; H04L 67/1034; H04L 69/40
See application file for complete search history.

(56) References Cited

U.S. PATENT DOCUMENTS

| | | | | |
|---|---|---|---|---|
| 8,918,673 | B1* | 12/2014 | Rangaiah | G06F 11/2028 714/4.11 |
| 9,116,862 | B1 | 8/2015 | Rath | |
| 9,274,903 | B1 | 3/2016 | Garlapati | |
| 9,984,140 | B1 | 5/2018 | Sukumaran | |
| 10,404,613 | B1 | 9/2019 | Brooker | |
| 10,713,129 | B1* | 7/2020 | Tummala | G06F 11/1458 |
| 2005/0193227 | A1* | 9/2005 | Nakahara | G06F 11/3452 714/4.1 |
| 2005/0283658 | A1 | 12/2005 | Clark | |
| 2006/0047776 | A1* | 3/2006 | Chieng | G06F 11/2048 709/217 |
| 2007/0006015 | A1 | 1/2007 | Rao | |
| 2007/0180314 | A1* | 8/2007 | Kawashima | G06F 11/3433 714/15 |
| 2008/0294933 | A1* | 11/2008 | Nishii | G06F 11/2025 714/5.11 |
| 2009/0228589 | A1* | 9/2009 | Korupolu | H04L 67/1002 709/226 |
| 2009/0290483 | A1 | 11/2009 | Curtis | |
| 2010/0325473 | A1* | 12/2010 | Agneeswaran | G06F 11/2041 714/4.1 |
| 2011/0099146 | A1 | 4/2011 | McAlister | |
| 2011/0145243 | A1 | 6/2011 | Yudenfriend | |
| 2011/0239215 | A1* | 9/2011 | Sugai | G06F 9/5088 718/1 |
| 2014/0059379 | A1* | 2/2014 | Ren | G06F 11/2069 714/15 |
| 2014/0317441 | A1* | 10/2014 | Arata | G06F 11/2025 714/4.12 |
| 2015/0178137 | A1* | 6/2015 | Gordon | H04L 67/1008 709/226 |
| 2016/0004552 | A1* | 1/2016 | Innan | H04L 67/1008 718/1 |
| 2018/0004612 | A1 | 1/2018 | Gahlot | |
| 2018/0143885 | A1 | 5/2018 | Dong | |
| 2018/0165166 | A1* | 6/2018 | Wang | G06F 11/203 |
| 2019/0235979 | A1 | 8/2019 | Li | |
| 2019/0250849 | A1 | 8/2019 | Compton | |
| 2019/0281014 | A1 | 9/2019 | Lin | |
| 2019/0324874 | A1* | 10/2019 | Gill | G06F 9/45558 |
| 2020/0042410 | A1 | 2/2020 | Gupta | |
| 2020/0104222 | A1* | 4/2020 | Ramamoorthi | G06F 11/00 |
| 2020/0257704 | A1 | 8/2020 | Du | |
| 2020/0319890 | A1* | 10/2020 | Compton | G06F 11/1471 |
| 2021/0004275 | A1 | 1/2021 | Avagyan | |
| 2021/0157692 | A1 | 5/2021 | MacCarthaigh | |
| 2021/0157693 | A1 | 5/2021 | Waters | |
| 2021/0157694 | A1 | 5/2021 | Dye | |
| 2021/0303422 | A1 | 9/2021 | Dye | |
| 2021/0306205 | A1 | 9/2021 | MacCarthaigh | |

OTHER PUBLICATIONS

Zhou, et al., "Cloud Service Reliability Enhancement via Virtual Machine Placement Optimization" 2017, IEEE Transactions on Services Computing, pp. 902-913.

Search Report and Written Opinion dated Jul. 16, 2021, issued in PCT/US2021/024173.

Search Report and Written Opnion dated Jun. 1, 2021 issued in PCT/US2020/062090.

* cited by examiner

MANAGING PRIMARY REGION AVAILABILITY FOR IMPLEMENTING A FAILOVER FROM ANOTHER PRIMARY REGION

BACKGROUND

Network-based computing, in general, is an approach to providing access to information technology resources through services, such as Web services, where the hardware and/or software used to support those services is dynamically scalable to meet the needs of the services at any given time. In network-based computing, elasticity refers to network-delivered computing resources that can be scaled up and down by a network service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online streaming service, set up with elastic resources so that the number of webservers streaming content to users scale up to meet bandwidth requirements during peak viewing hours, and then scale back down when system usage is lighter.

A client typically will rent, lease, or otherwise pay for access to the elastic resources accessed through network service, and thus does not have to purchase and maintain the hardware and/or software that provide access to these resources. This provides a number of benefits, including allowing users to quickly reconfigure their available computing resources in response to changing demands of their enterprise and enabling the network service provider to automatically scale provided computing service resources based on usage, traffic, or other operational requirements. This dynamic nature of network service computing services, in contrast to a relatively static infrastructure of on-premises computing environments, requires a system architecture that can reliably re-allocate its hardware according to the changing needs of its client base and demands on the network-based computing services.

In network-based computing, locations in which applications may be hosted and/or partitioned may be described as regions and/or availability zones. Each region comprises a separate geographic area from other regions and includes multiple, isolated availability zones. Each region may be isolated from all other regions in the network-based computing system. An availability zone is an isolated location inside a region. Each region is made up of several availability zones that each belong to a single region. Also, each availability zone is isolated, but the availability zones in a particular region are connected through low-latency links. When an application is distributed across multiple availability zones, instances may be launched in different availability zones to enable your application to maintain operation if one of the instances fails (for example, by allowing another instance in another availability zone to handle requests for the application).

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
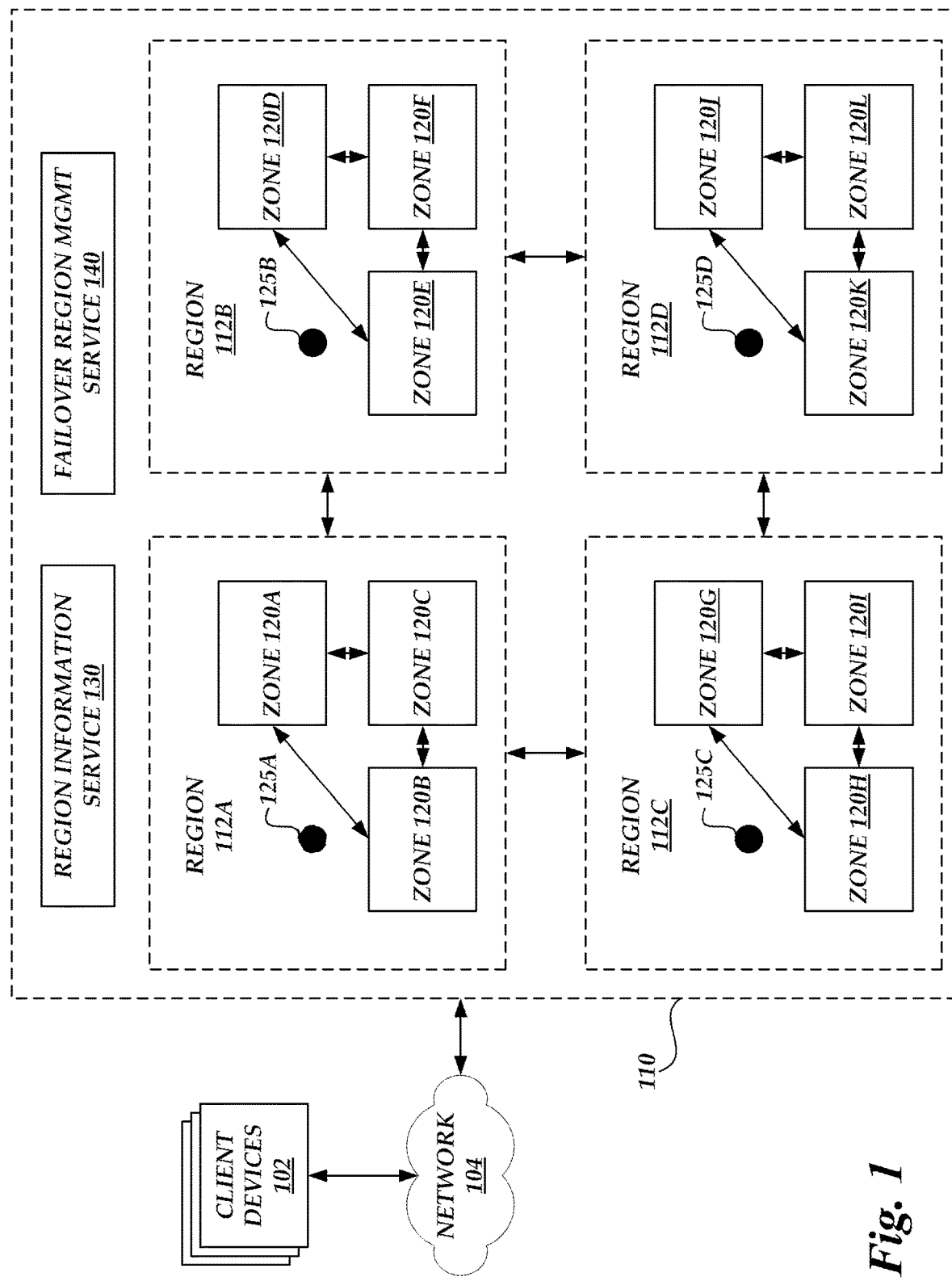
FIG. 1 depicts a schematic diagram of a network service provider in which various embodiments according to the present disclosure can be implemented.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to the management of network-based regional management services in a network-based computing system. In the network-based computing system, customers can design applications that are partitioned across various isolated computing systems (referred to as "availability zones" or regions). When partitioned as such, each of the various zones or regions hosts a partition of the applications identical to the other partitions of the applications.

In the unlikely event that one of the zones or regions fails, the partitions of the applications hosted by the other zones or regions provide redundancy or failover, allowing the applications to continue running based on the resources in the other zones or regions. More specifically, aspects of the present disclosure relate to providing network-based regional management services that enable predictable, controlled, and reliable failover. The network-based regional management services facilitate the management of one or more primary regions to be available or primed in the event of a failure of another primary region. The network-based regional management services can identify target primary regions and utilize processing rules to determine which target primary regions can be characterized as "available" for failover from other primary regions based on information such as capacity, readiness, and the like. The processing rules may be based on capacity of a primary region, data lag, location of a primary region, latency of a primary region, etc. For example, the processing rules may include a processing rule that requires a primary region to be located within a certain distance of another primary region. Further, the processing rules may include a processing rule that requires a primary region to be configured with sufficient data processing speed. The processing rules may further include processing rules directed to one or more operations of a primary region. Still further, for target primary regions that have been characterized as "unavailable" for one or more other primary regions or have not been otherwise characterized as "available," for one or more other primary regions the network-based regional management services can further implement remediation processes to modify or supplement. Accordingly, a target primary region may be considered unavailable for failover from one primary region and available for failover from another primary region based on information associated with each primary region. In some implementations, a first target primary region may be available for failover from every other primary region and a second target primary region may be unavailable for failover from every other primary region.

The remediation process can illustratively be implemented manually or automatically and can be customized to allow for one or more primary regions to achieve a characterization of available with respect to one or more other primary regions or with respect to all other primary regions. When such a failure of one application partition does not obstruct operation of the application in other partitions, or negatively impact the data integrity of data associated with the application (i.e., when a failover workflow ensure that network requests, etc., are appropriate transitioned or directed to a backup partition), the application is said to be highly available because the partitions enable the application to be available more often than not.

Existing mechanisms for managing failovers are overly complicated, significantly increase design work required by customers, and lack features that provide the customer visibility and control over the mechanisms. The present disclosure addresses such problems by providing a system for managing network-based regional management services that better coordinate failover workflow design and execution while maintaining data integrity of the data associated with the application partitions to enable highly available applications. The system for managing regional management services described herein supports a wide range of failover use cases. For example, the regional management services support use cases where a primary application partition is running on customer (or other) premises with disaster recovery (DR) set up in the cloud, use cases where the primary application partition is running in the cloud with DR set up on premises, as well as use cases where both the primary application partition and DR are set up in the cloud or on premises.

The network-based regional management services of the present disclosure improve upon the faults of the existing mechanisms in various ways. The system for managing regional management services of the present disclosure enables customers to manually remediate primary regions that are considered unavailable for failover from one or more other primary regions so that they meet the requirements to be considered available for the one or more other primary regions in the event of a failover. As described above, in some embodiments, the network-based regional management service automatically remediates primary regions based upon certain readiness requirements set by a client. The system for managing regional management services informs a client of the available primary regions and the corresponding primary regions that are available for failover for each primary region, which can be specifically identified or characterized based upon custom rules provided by the user. In some implementations, one primary region may be designated as available for failover from another primary region. In another implementation, multiple primary regions may be designated as available for failover from another primary region, alone or in combination. For example, a first primary and a second primary region, when considered individually, may be considered unavailable for failover of a third primary region. However, the first primary region and the second primary region, when considered together, may be considered available for failover of the third primary region. For further example, the first primary region may be configured to take 80% of the partitions of the third primary region and the second primary region may be configured to take 20% of the partitions of the third primary region in the event of a failover.

The custom rules may correspond to a list of rules which may be based at least in part upon state information derived from a primary or default region. By way of illustrative example, one rule of the list of rules may correspond to matching or exceeding number of partitions hosted by the respective primary region. For example, each primary region may be linked to a rule corresponding to the number of partitions hosted by that primary region. Further, another primary region may be considered available for failover from that primary region based on application of the rule. Accordingly, the network-based system would identify target primary regions meeting the established partition threshold, identify target primary regions not meeting the established partition threshold and remediate one or more target threshold regions by increasing the number of partitions. Additional details regarding each of these benefits are provided below.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only, and are not intended to be limiting.

FIG. 1 depicts an example computing environment 100 in which a network service provider 110 provides network-based services to client devices 102 via a network 104. As used herein, a network service provider 110 implements network-based services 110 (sometimes referred to simply as a "network-based services 110" or a "services 110") and refers to a large, shared pool of network-accessible computing resources (such as compute, storage, or networking resources, applications, or services), which may be virtualized or bare-metal. The network service provider 110 can provide convenient, on-demand network access to the shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network 104 and the hardware and software in the network service provider 110 that provide those services.

As shown in FIG. 1, the network service provider 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in Asia, etc. While four regions 112 are shown in FIG. 1, a network service provider 110 may include any number of regions. Each region 112 is illustratively in communication via a network, which may be a private network of the system 110 (e.g., privately owned circuits, leased lines, etc.) or a public network (e.g., the Internet).

In FIG. 1, each region 112 is further shown as divided into a number of zones 120 (across all regions 112, zones 120A-L), which may also be referred to as availability zones or availability regions. Each zone 120 illustratively represents a computing system that is isolated from the systems of other zones 120 in a manner that reduces a likelihood that wide-scale events, such as natural or man-made disasters, impact operation of all (or any two) zones 120 in a region. For example, the computing resources of each zone 120 may be physically isolated by being spread throughout the region 112 at distances selected to reduce a likelihood of a wide-scale event affecting performance of all (or any two) zones 120. Further, the computing resources of each zone 120 may be associated with independent electric power, and thus be electrically isolated from resources of other zones 120 (though the resources may still communicate with one another via a network, which may involve transmission of electrical signals for communication rather than power), independent cooling systems, independent intra-zone networking resources, etc. In some instances, zones 120 may be further isolated by limiting operation of computing resources between zones 120. For example, virtual machine instances in a zone 120 may be limited to using storage resources, processing resources, and communication links in that zone 120. Restricting inter-zone cloud or network-based computing operations may limit the "blast radius" of any failure within a single zone 120, decreasing the chances that such a failure inhibits operation of other zones 120. Illustratively, services provided by the network service provider 110 may generally be replicated within zones 120, such that a client device 102 can (if they so choose) utilize the network service provider 110 entirely (or almost entirely) by interaction with a single zone 120.

As shown in FIG. 1, each zone 120 is in communication with other zones 120 via the communication links. Preferably, the communication links between the zones 120 represent high speed, private networks. For example, zones 120 may be interconnected via private fiber optic lines (or other communication links). In one embodiment, the communication links between zones 120 are dedicated entirely or partially to inter-zone communication, and are separated from other communication links of the zone(s). For example, each zone 120 may have one or more fiber optic connections to each other zone, and one or more separate connections to other regions 112 and/or the network 104.

Each zone 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1 as having a single connection to the network 104, multiple connections may exist in various implementations. For example, each zone 120 may have one or more connections to the network 104 distinct from other zones 120 (e.g., one or more links to an Internet exchange point interconnecting different autonomous systems on the Internet).

Each region 112A-112D includes an endpoint 125A-125D, respectively. The endpoints 125A-125D may comprise computing devices or systems through which the customer's application can access the network-based services 110. Information provided to one of the endpoints 125 may be propagated to all other endpoints 125. Each region 112 may include more than one endpoint 125 or each region 112 may not include even one endpoint 125.

With continued reference to FIG. 1, the network service provider 110 further includes a region information processing service 130 and a region management service 140. As will be described in greater detail below, the region information processing service 130 can be configured to determine a target set of regions that can be designated as one or more primary regions for an individual customer or set of customers. For example, the region information processing service 130 can process customer specific criteria to determine which regions will be designated as the primary regions. The region information processing service 130 can further select primary regions based on selection criteria as described herein.

The region management service 140 can be configured to receive the target set of primary regions and characterize the availability of at least some portion of the primary regions based on application of one or more processing rules. Illustratively, individual processing rules can correspond to an identification of a parameter and one or more thresholds associated with the identified parameter. The parameters correspond to resources configurations or performance metrics that define the ability for a primary region to be considered an available primary region for one or more other primary regions. The processing rules may vary for each of the primary regions. In one implementation, the processing rules may be uniform for each of the primary regions. The processing rules may be configured by a customer, the network service provider, or a third party. Additionally, the processing rules may be derived, in part, on the attributes or parameters of the designated primary region (e.g., matching the current attributes of a designated primary region). The region management service 140 can further implement a processing engine that can implement processes responsive to a determined list of available or unavailable primary regions. The processing engine can illustratively implement one or more remediation processes that can attempt to modify or supplement primary regions that were not determined as available for the designated primary region based on the previous application of the processing rules. The processing engine can further implement readiness processes that can be utilized to determine whether the previously determined available primary regions are operationally ready or operable to function in a failover capacity. The results of the failover processes (e.g., remediation or readiness processing) can be utilized to modify or update the list of available primary regions.

Client computing devices 102 can include any network-equipped computing device, for example desktop computers, laptops, smartphones, tablets, e-readers, gaming consoles, and the like. Users can access the network service provider 110 via the network 104 to view or manage their data and computing resources, as well as to use websites and/or applications hosted by the network service provider 110. For example, users may access an application having a partition hosted by a zone 120A in the region 112A (for example, a primary) and a zone 120L in the region 112D (for example, a secondary partition).

In accordance with embodiments of the present disclosure, the application having partitions hosted in different zones may be able to withstand a failure in one of the zones 120 or regions 112 in which one of the partitions is operating. For example, if the primary partition hosted in zone 120A experiences a failure, any requests that would normally be handled by the primary partition in the zone 120A may be instead routed to and handled by the secondary partition running in the zone 120L. Such a failure may result in a failover scenario, where operations of the primary partition are transferred to the secondary partition for handling. Failover scenarios may involve manual actions by the customer associated with the application to request routing of communications and so forth from the primary partition to the secondary partition. However, embodiments of the present disclosure can also provide a highly available, managed regional management service for applications having partitions hosted in different zones that enables the customer's application to withstand zone or region failures with reduced or minimal interaction from the customer during a failover scenario while maintaining data integrity during such failures and failovers.

Figure 2:
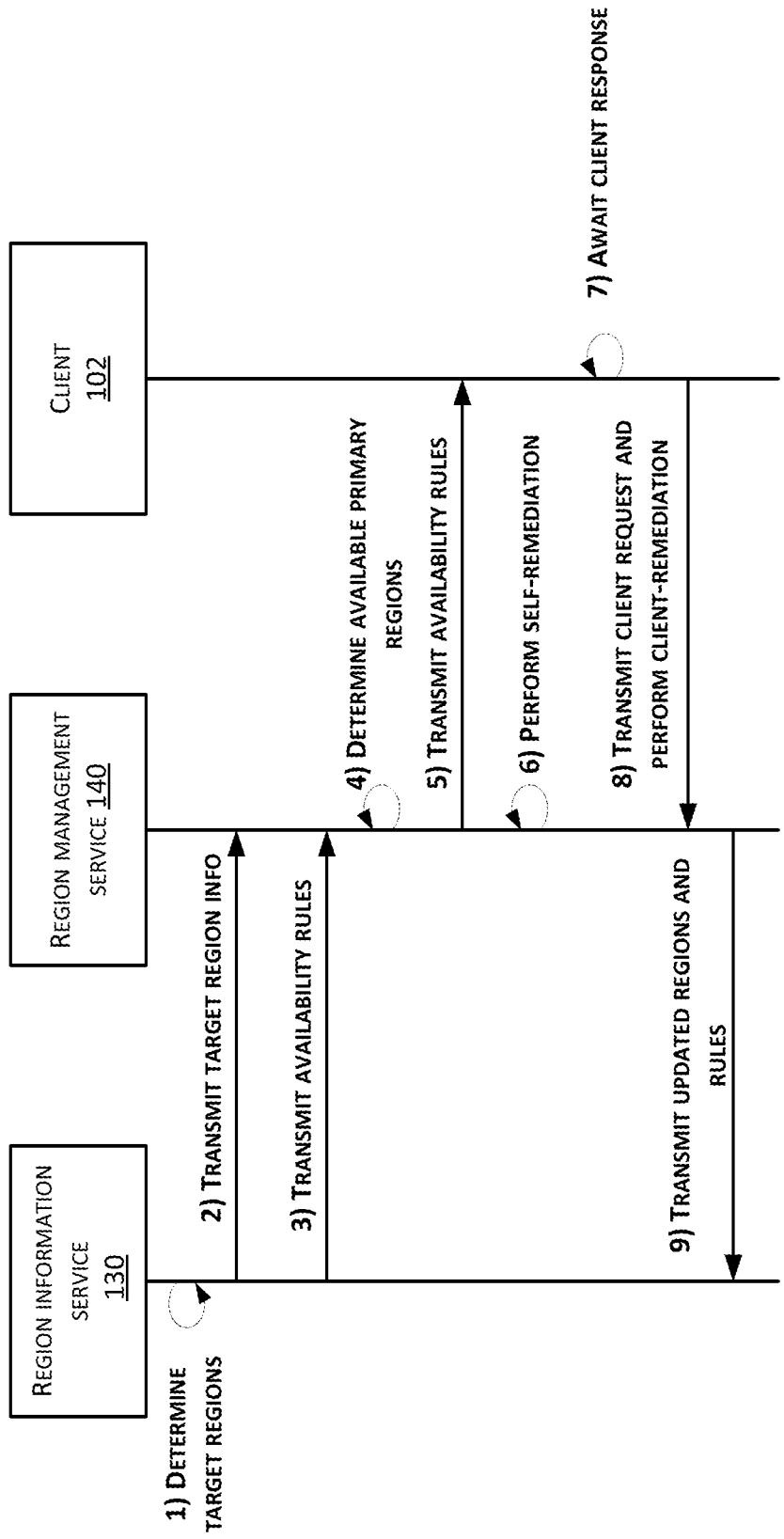
FIG. 2 depicts an example workflow of interactions that manage the availability of each primary region.

FIG. 2 depicts an example workflow 200 of interactions the region information processing service 130, the region management service 140 and a client device 102 to determine and manage primary region availability for failover of one or more other primary regions in accordance with an illustrative embodiment. As illustrated in FIG. 2, at (1), the region information processing service 130 determines a set of primary regions. The region information processing service 130 may include components for determining a list of primary regions and a list of processing rules. In one embodiment, the region information processing service 130 may generate or obtain the list of regions based on geographic or network proximity, e.g., primary regions within a defined radius. For example, the region information processing service 130 may be configured to provide the list of primary regions located within 500 miles of a designated location or set of locations. In some implementations, the region information processing service 130 may be configured to provide the list of primary regions located within the same country as the user. In some implementations, the region information processing service 130 may be configured to provide the list of primary regions associated with the same user or hosting a user's partitions. In some implementations, the region information processing service 130 update the list of rules and the list of primary regions periodically. For example, the region information processing service 130 may update every hour. In some implementations, the region information processing service 130 may update when instructed to update by a client. In some implementations, the region information processing service 130 may update periodically and update when instructed to update by the client.

In another embodiment, the region information processing service 130 may also determine or identify the primary regions based on application of selection criteria related to attributes or characteristics of the primary regions. For example, the region information processing service 130 may identify or select the region hosting the greatest number of partitions as one primary region. Further, the region information processing service 130 may designate the regions hosting the five greatest number of partitions as the primary regions. In other examples, the region information processing service 130 can also consider network capacity in terms of measured network traffic or executed instructions/processes, measured load or utilization rate availability rates, error rates, attributed financial cost, infrastructure, workload locality, and the like in selecting the set of primary regions. Illustratively, the client 102 may select any parameter related to determination of the offset of primary regions. The network service provider 110 may also specify one or more parameters, such as a minimum list of requirements. For example, the network service provider 110 may specify minimum requirements in terms of capacity and measured load to select primary regions.

At (2), the region information processing service 130 transmits the list of primary regions to the region management service 140. At (3), the region information processing service 130 transmits a set of availability processing rules that allow the region management service 140 to determine or characterize availability of the set of primary regions. Each primary region may correspond to a list of availability processing rules. As described above, an individual processing rule can include an identification of one or more parameters (or combination of parameters) and a corresponding one or more thresholds that characterize the availability of an individual primary region with respect to another one or more primary regions. Illustratively, the same parameter and threshold may determine whether the primary region is either available or unavailable (e.g., a region matching or exceeding the threshold). In other embodiments, the processing rule can include a first parameter threshold for determining availability and a second parameter threshold for determining unavailability. In this embodiment, having different parameters can be utilized in conjunction with the region selection criteria previously processed by the region information processing service 130 or the remediation processes implemented by the region management service 140. For example, if the region information processing service 130 does not filter out any regions, a second threshold parameter may be set to filter out any regions that have no ability to be remediated by the region management service 140.

At (4), the region management service 140 determines the number of available primary regions and transmitting these regions to the client 102 at (5) for one or more of the primary regions. In one implementation, the region management service 140 may be configured to determine the number of available primary regions for each of the primary regions. As described above, the region management service 140 can apply the processing rules to the target set of primary regions to identify a set of available primary regions, a set of unavailable regions or combinations/sub sets thereof.

At (6), the region management service 140 can implement one or more additional process responsive to the determined availability or unavailability of a set of primary regions. Such responsive processes can include self-remediation in which the region management service 140 automatically attempts to configure one or more primary regions that have been characterized as unavailable for one or more other primary regions in a manner to allow the characterized regions to be subsequently characterized as available. In some embodiments, the self-remediation may include remediating a capacity issue of a primary region. For example, the self-remediation may include increasing the capacity of a region, wherein the capacity is increased such that if an event occurs, the region is primed such that they are available for failover of another primary region. In some embodiments, the self-remediation may include remediating a configuration of a primary region. For example, the self-remediation may include changing the configuration of one or more regions such that they are available for failover. The automatic or self-remediation may be limited or configured by the region management service 140 according to client procedures/limits, such as defining cost limits or the extent of allowable changes. In other embodiments, as described herein, the region management service 140 can also conduct readiness checks to verify that target primary regions are currently running and able to function as primary regions.

At (7), the region management service 140 may await a client response from the client 102. The client 102 may be provided a list of available primary regions and a list of unavailable primary regions. The client 102 may be provided with an interface of selecting one or more unavailable primary regions to be remediated so that the one or more unavailable primary regions become one or more available primary regions. For example, as further seen in FIG. 3, the client 102 may be provided with a client interface detailing the available primary regions and the unavailable primary regions. In other embodiments, the client 102 may also specify priority information that facilitates a determination of which potential unavailable region to remediate.

Illustratively, at (8), the client 102 transmits a client response to the region management service 140. The region management service 140 may be configured to perform the specified remediation corresponding to the client response. The client response may include any set of instructions related to the status of the one or more regions. In some embodiments, the client response may provide one or more regions for remediation, such that the one or more regions satisfy each rule of the list of rules of a corresponding one or more primary regions. In some embodiments, the client response may include modifications to the list of rules, wherein the client 102 provides one or more rules to be included in the list of rules.

At (9), the region management service 140 can transmit an updated list of available primary regions or other configuration information to the region information processing service 130. The updated list of primary regions can include updates based on successful remediation or passage/failure of the readiness test. The region management system 106 may be configured to update the list of available primary regions and provide this information to the region information system 102. The region management system 106 may also be configured to update the list of rules based on the client response in (7). The region management 106 may then be configured to provide the updated list of rules to the region information system 102. The region information system 102 may then store the updated list of available regions and the updated list of rules.

Figure 3:
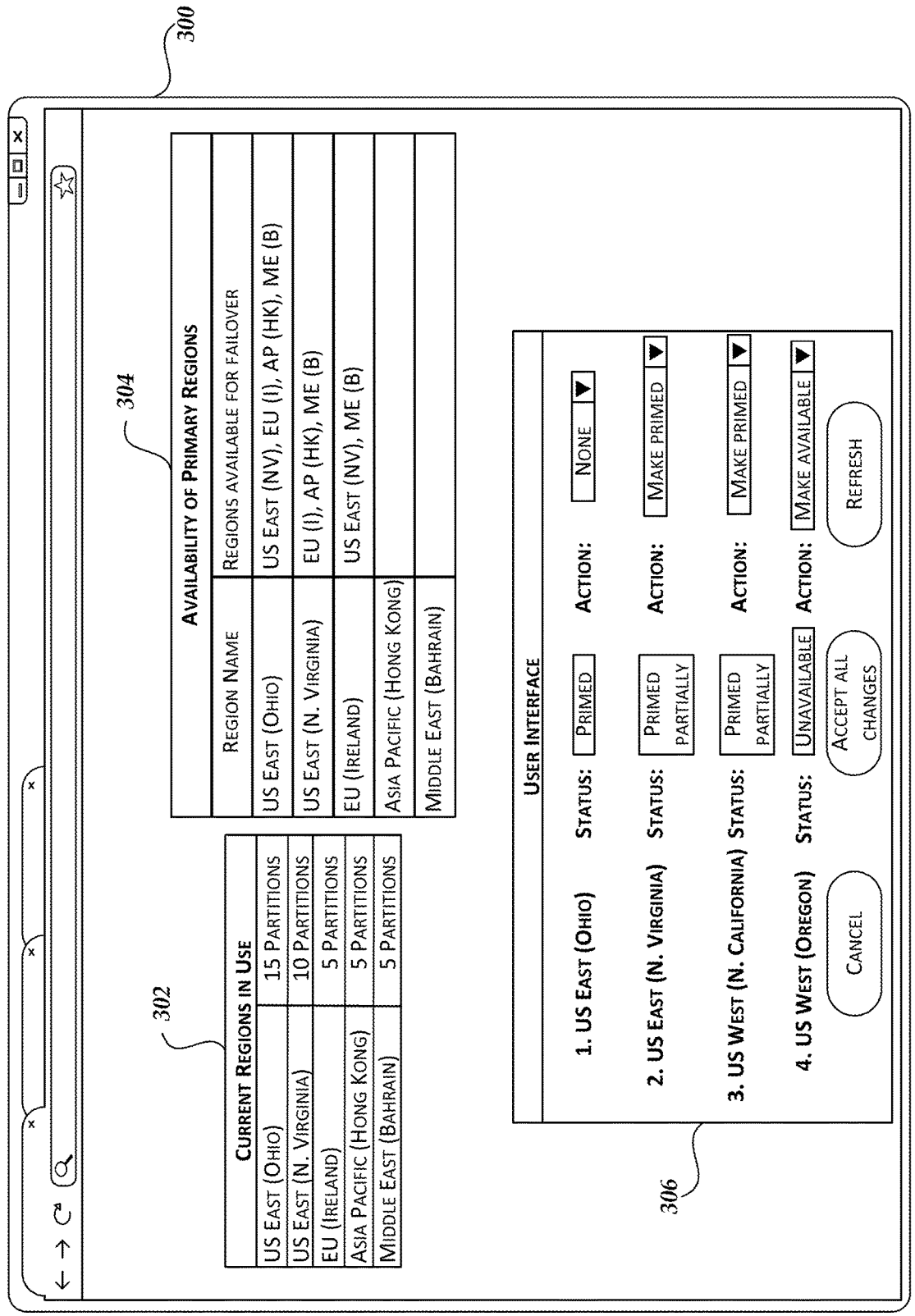
FIG. 3 depicts an example client interface that allows a client to select how the regional management service is managed.

FIG. 3 depicts an example client interface 300 for managing a failover service for primary regions. The client interface 300 may enable the customers whose applications are hosted by a network service provider 110 to create dependency trees and failover workflows for their applications. The dependency trees may map and track upstream and downstream dependencies for the customer's applications to determine the steps to take in a failover to ensure data integrity between the application partitions and the continued availability of the application. Furthermore, the regional management service may map the upstream and/or downstream dependencies of sub-applications of the customer applications. Based on the mapped partitions and dependencies, the regional management service may coordinate partition or node failover in a sequential manner for any of the individual applications. In some embodiments, the dependencies may comprise other applications or services that provide data and requests.

In some embodiments, the interface 300 is also used to identify failover workflows to be triggered based on the failover states and/or other conditions. The dependency trees and the workflows may be created when the customer designs and creates the application or after the application is created and partitioned. Such dependency trees and failover workflows may enable the regional management service to provide visibility into particular dependencies for the application. For example, enabling the customer to see its application's upstream and downstream dependencies, the customer may better understand what sequence of steps or actions are needed during a failover of an application partition or node to ensure availability of the application and data integrity for associated data and can generate the failover workflow accordingly. Thus, the customer may be able to more easily generate a workflow comprising the sequence of steps or actions needed when a failover occurs as opposed to when the dependency tree is not available.

In some embodiments, such failover workflows may be manually triggered by the customer or automatically triggered by the regional management service based on the failover states of application partitions or nodes. By tracking the application dependencies and corresponding workflows, the regional management service may enable customers to orchestrate failover procedures for applications in a safe, reliable, and predictable manner that maintains data integrity and application availability.

In some embodiments, the customer models their application and/or cells of their application using the failover service. The cells, as used herein, may represent partitions, nodes, or any unit of the application that could be a point of or experience a failure. The customer can use the models of the regional management service to define the sequence of steps needed during the failover across one or more applications based on the dependency trees and the like. For example, if the customer detects a failure in the primary partition of the application, the customer can trigger an autoscaling step to scale applications in the secondary partition, after which the customer can trigger a traffic management service to redirect client traffic to the secondary partition. Such controls enable the customer to manage distributed, multi-tier applications in a controlled, reliable, and predictable manner. In some embodiments, the traffic management service may route traffic to an optimal application endpoint based on various parameters relating to performance of the application. In some embodiments, the customer can generate the workflow to include the actions identified above in the event the failure is triggered such that the actions are performed automatically by the failover service.

Similarly, the regional management service may provide such controls to the customer to configure workflows (for example, including traffic routing actions using the traffic management service and/or a Domain Name System (DNS) service) implemented based on state changes for application partitions or nodes. In some embodiments, the customer may also configure metadata with state changes for application partitions or nodes. For example, the application partition or node state change may trigger a failover or changing of endpoint or traffic weights per zone or region for the traffic management service and/or the DNS service (also referred to herein as the routing service), which may enable automation of failover workflows and/or sequences of steps.

As described herein, the regional management service for the customer application may enable the customer to generate the failover workflow for the application that identifies one or more actions or steps to be taken should the primary partition of the application experience a failure. Thus, as described above, the failover workflow may include steps to take to ensure continued operation of the application and maintained data integrity through individual partition failures. For example, the workflow may include identification of the secondary partition that is a backup to the primary partition (for example, becomes a new primary partition) when a previous primary partition experiences a failure. The failover workflow may also define the state to which the primary partition transitions when it experiences a failure. Though reference herein is made to primary and secondary partitions, the regional management services and the failover workflow may apply equally to primary and second nodes.

The client interface 300 may include a first client interface 302 for representing the current regions being used by the client's application. The first client interface 302 may include the names of the regions that are currently being used the client's application. The regions represented in the first client interface 302 may correspond to the primary regions of the client. The first client interface 302 may also include the number of partitions currently being implemented in a certain region. The first client interface 302 may contain other information related to the one or more regions that are being actively used at one moment in time by the client.

The client interface 300 may include a second client interface 304 for representing primary regions that are available to the user. The second client interface 304 may provide information to the client related to the primary region. For example, the second client interface 304 may provide the name of the region or the zone and the regions that the primary region is available for failover. In some implementations, the second client interface 304 may include information about combinations of primary regions that are available for failover. Further, the second client interface 304 may be configured to provide information related to the failure rate, downtime, or any other factor of a region that may be used in selecting a region for failover.

The client interface 300 may include a third client interface 306 for representing a client input, wherein a client may select one or more options to be performed by the client interface 300. The third client interface 306 may first include a designation of the primary regions that are primed or available for failover. One or more primary regions may be primed for failover from each of the other primary regions. One or more primary regions may be primed for failover from one or more of the other primary regions. The available primary regions may correspond to one or more regions that satisfy each rule of the list of rules for one or more other primary regions. The available regions may further correspond to a list of regions that have previously been designated as available. The third client interface 306 may be configured to periodically update the list of available primary regions. For example, the third client interface 306 may be configured to update the available primary regions. Further, the third client interface 306 may be configured to update the available primary regions based upon an input provided by the client. For example, the client may direct the third client interface 306 to update the available primary regions based upon the client pressing the refresh button located in the third client interface 306.

The third client interface 306 may include a designation of one or more regions as unavailable primary regions. The unavailable primary regions or zones may correspond to one or more regions or zones that do not satisfy at least one of the availability rules from the list of rules for one of the primary regions. The unavailable primary regions may further correspond to a list of regions that have previously been designated as unavailable. The third client interface 306 may include information detailing why one or more regions are unavailable primary regions. The third client interface 306 may include a description of the one or more unavailable primary regions. The third client interface 306 may include a description of the remediation steps that could be taken to remediate one or more unavailable primary regions. The third client interface 306 may be configured to periodically update the list of unavailable primary regions. For example, the third client interface 306 may be configured to update the unavailable primary regions every hour. Further, the third client interface 306 may be configured to update the unavailable primary regions based upon an input provided by the client. For example, the client may direct the third client interface 306 to update the unavailable primary regions based upon the client pressing the refresh button located in the third client interface 306.

The third client interface 306 may include an action list for each primary region corresponding to the client. Each primary region corresponding to the client may include one or more regions that the client has preselected for possible failover. The action list may include a list of actions that the third client interface 306 may cause to be performed on the corresponding primary region. Further, a possible action may be to make a previously unavailable primary region an available primary region. For example, the third client interface 306 may detect that a first primary region is hosting 15 partitions and a second primary region can only host 10 partitions. The third client interface 306 may then determine that the second primary region is an unavailable primary region for the first primary region because it cannot satisfy the capacity requirements of the first primary region. In one implementation, the second primary region may be designated as an available primary region when in combination with another primary region, such as a third primary region that can host 5 partitions. The third client interface 206 may, upon an input by a client, make the second primary region an available primary region by increasing the capacity of the second primary region to 15 partitions or above. The third client interface 306 may include other options for client communication including but not limited to a "cancel" button and an "accept all changes" button.

In some implementations, the client interface 300 may include one or more other client interfaces for representing more information pertaining to the regions hosting a client's applications. The client interface 300 may include a fourth client interface that represents the applications that are currently being hosted. The fourth client interface may include information about the number of primary regions hosting each application. The fourth client interface may include information about the status of each application. The client interface 300 may include a fifth client interface that represents the one or more clusters that are associated with a client.

Figure 4:
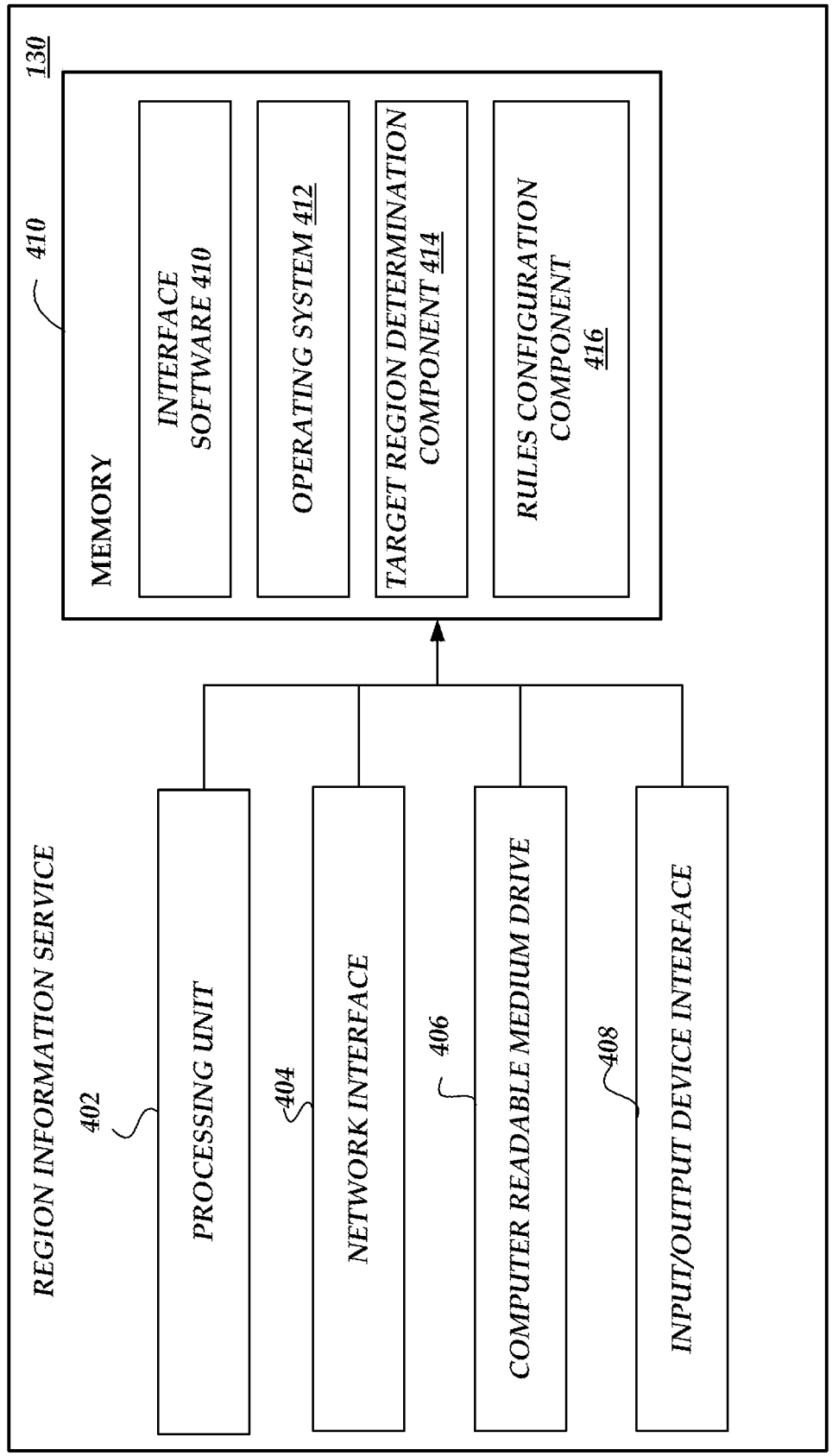
FIG. 4 depicts an example schematic diagram that implements a regional information processing service in accordance with illustrative aspects of the present disclosure.

FIG. 4 depicts a general architecture of a computing device configured to perform the regional information processing service 130, according to some embodiments. The general architecture of the region information processing service 130 depicted in FIG. 4 includes an arrangement of computer hardware and software that may be used to implement aspects of the present disclosure. The hardware may be implemented on physical electronic devices, as discussed in greater detail below. The region information processing service 130 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1.

As illustrated, the region information processing service 130 includes a processing unit 402, a network interface 404, a computer readable medium drive 406, and an input/output device interface 408, all of which may communicate with one another by way of a communication bus. The network interface 404 may provide connectivity to one or more networks or computing systems. The processing unit 402 may thus receive information and instructions from other computing systems or services via the network. The processing unit 402 may also communicate to and from memory 410 and further provide output information for an optional display via the input/output device interface 408. The input/output device interface 408 may also accept input from an optional input device (not shown).

The memory 410 can contain computer program instructions (grouped as units in some embodiments) that the processing unit 402 executes in order to implement one or more aspects of the present disclosure. The memory 410 corresponds to one or more tiers of memory devices, including (but not limited to) RAM, 4D XPOINT memory, flash memory, magnetic storage, and the like.

The memory 410 may store an operating system 414 that provides computer program instructions for use by the processing unit 402 in the general administration and operation of the failover service. The memory 410 may further include computer program instructions and other information for implementing aspects of the present disclosure. For example, in one embodiment, the memory 410 includes a user interface unit 412 that generates user interfaces (and/or instructions therefor) for display upon a computing device, e.g., via a navigation and/or browsing interface such as a browser or application installed on the computing device. In addition to and/or in combination with the user interface unit 412, the memory 410 may further include a primary region determination component 416 configured to detect and generate the list of regions and the list of rules. The memory 410 may also include a rules configuration component 418 to manage the implementation of availability rules.

Figure 5:
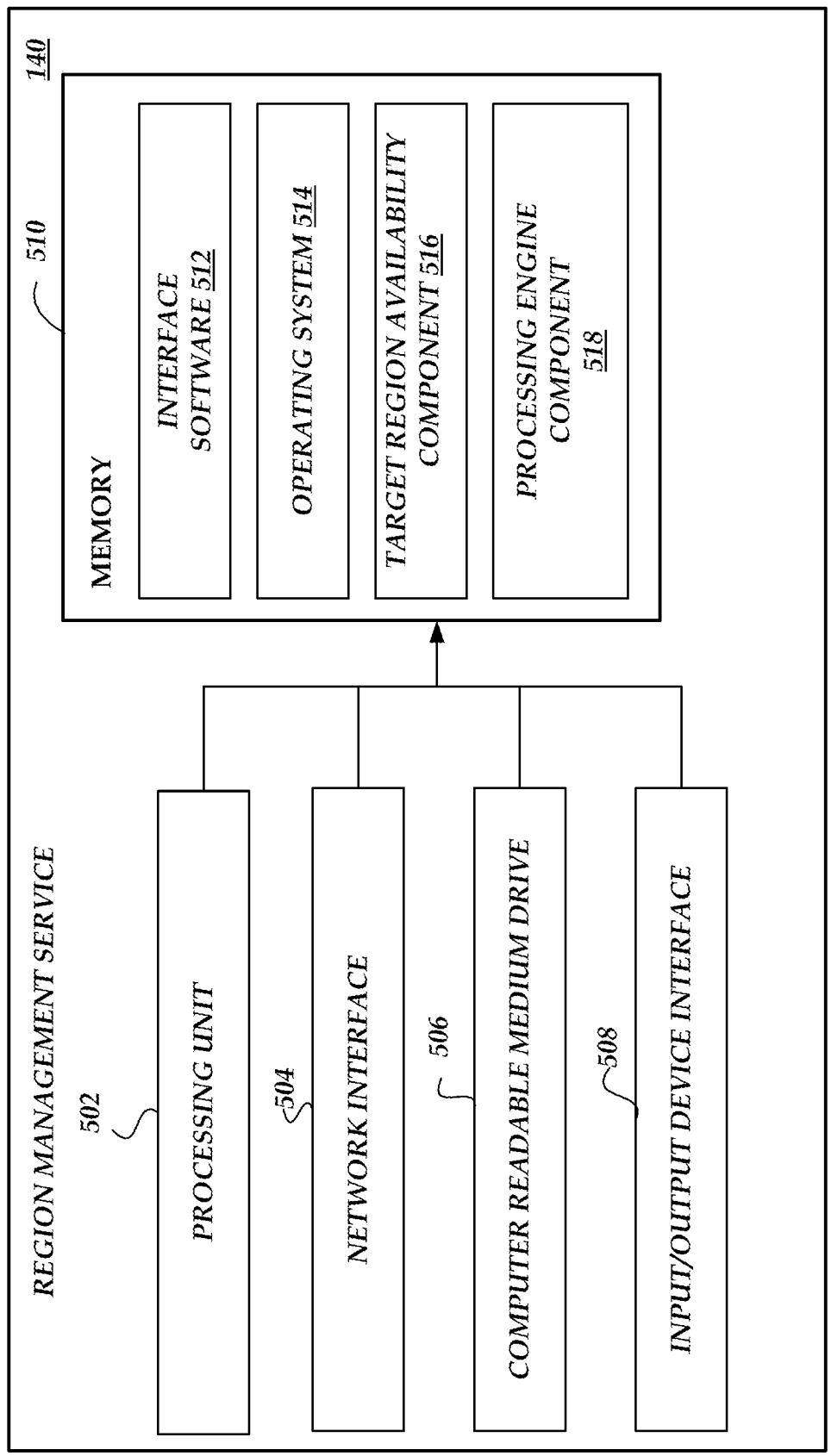
FIG. 5 depicts an example schematic diagram that implements the regional management service in accordance with illustrative aspects of the present disclosure.

FIG. 5 depicts a general architecture of a computing device configured to perform the region management service 140, according to some embodiments. The general architecture of the region management service 140 depicted in FIG. 5 includes an arrangement of computer hardware and software that may be used to implement aspects of the present disclosure. The hardware may be implemented on physical electronic devices, as discussed in greater detail below. The region management service 140 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1.

As illustrated, the region management service 140 includes a processing unit 502, a network interface 504, a computer readable medium drive 506, and an input/output device interface 508, all of which may communicate with one another by way of a communication bus. The network interface 504 may provide connectivity to one or more networks or computing systems. The processing unit 502 may thus receive information and instructions from other computing systems or services via the network. The processing unit 502 may also communicate to and from memory 510 and further provide output information for an optional display via the input/output device interface 508. The input/output device interface 508 may also accept input from an optional input device (not shown).

The memory 510 can contain computer program instructions (grouped as units in some embodiments) that the processing unit 502 executes in order to implement one or more aspects of the present disclosure. The memory 510 corresponds to one or more tiers of memory Devices, including (but not limited to) RAM, 3D XPOINT memory, flash memory, magnetic storage, and the like.

The memory 510 may store an operating system 514 that provides computer program instructions for use by the processing unit 502 in the general administration and operation of the failover service. The memory 510 may further include computer program instructions and other information for implementing aspects of the present disclosure. For example, in one embodiment, the memory 510 includes a user interface unit 512 that generates user interfaces (and/or instructions therefor) for display upon a computing device, e.g., via a navigation and/or browsing interface such as a browser or application installed on the computing device. In addition to and/or in combination with the user interface unit 512, the memory 510 may further include a primary region availability determination component 516 configured to detect and generate the list of primary regions and the list of rules. The memory 510 may also include a region processing engine component 518 to manage the implementation of processes, such as remediation or readiness processing.

Figure 6:
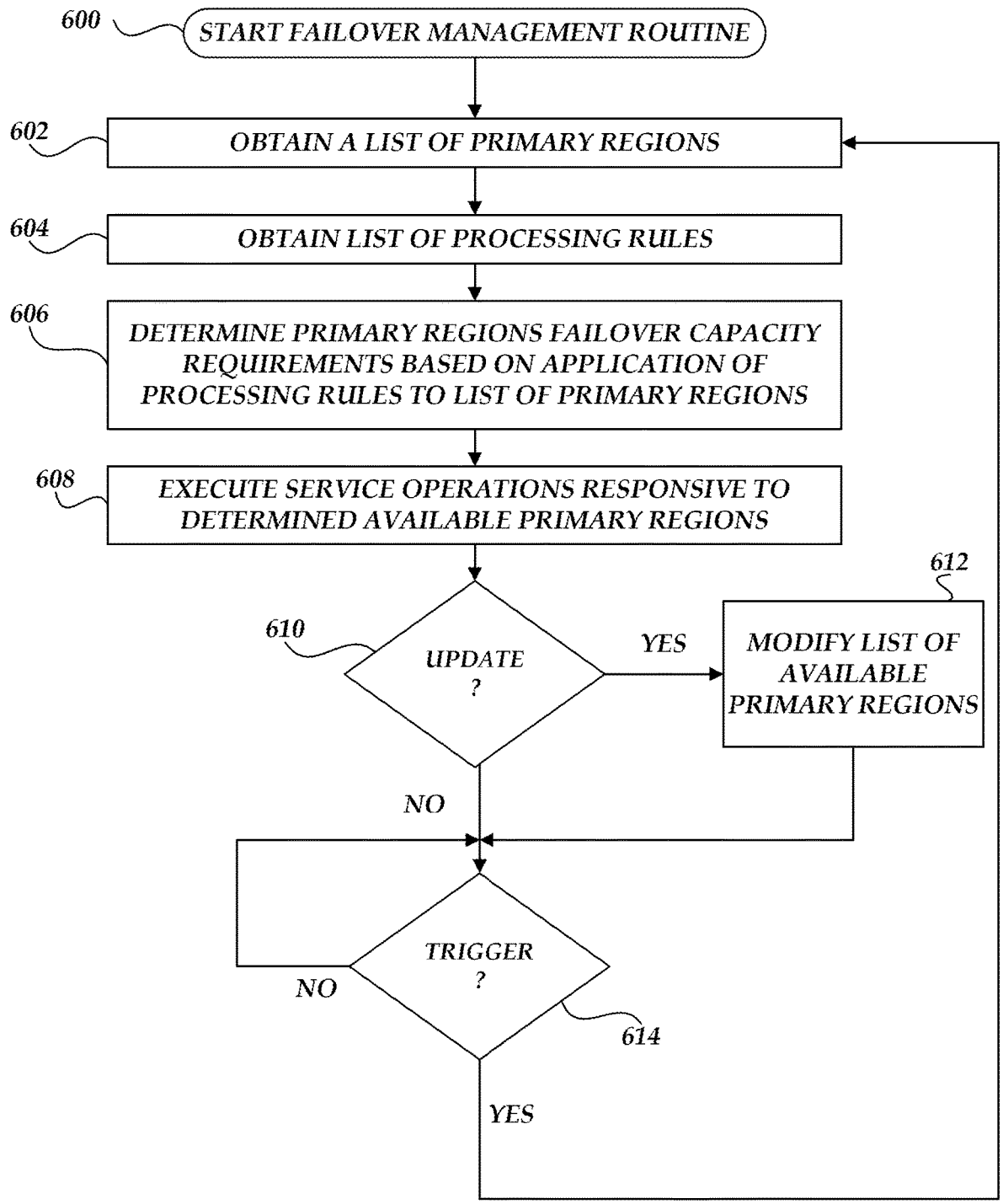
FIG. 6 is a flow diagram illustrative of a regional management routine implemented by a regional management service in accordance with illustrative aspects of the present disclosure.

FIG. 6 is a flow diagram depicting an example routine 600 for managing a failover service. The routine 600 may be carried out by the region management service 140, for example.

The routine 600 begins at block 602, where the region management service 140 obtains a list of primary regions. The list of primary regions may contain one or more primary regions. The list of primary regions may correspond to regions previously designated as available primary regions. The list of primary regions may correspond to all or a portion of all of the regions within a certain area. The list of primary regions may be provided by a client for input into the failover service. The list of primary regions may be detected by examining each region that is running a client's partitions.

The routine 600 then continues at block 604, where the region management service 140 obtains a list of rules for each primary region of the list of primary regions. The list of rules 306 may contain one or more rules where the one or more rules may be related to one or more region parameters for the corresponding primary region. The list of rules 306 may correspond to rules that must be satisfied for a region to be considered an available primary region for the corresponding primary region. The list of rules 306 may be provided in whole or in part by a client. The list of rules 306 may be provided in whole or in part based on a determination by the region information system 306. For example, the region information system 306 may determine that the client has seven primary regions and the primary region with the highest partitions running is primary region X which is running 20 partitions. The region information system 306 may then determine that one rule for primary region X is that a primary region must have a capacity to run 20 partitions to be considered an available primary region for primary region X.

The routine 600 continues at block 606, where the region information processing service 130 must obtain the list of available primary regions for each primary region. The list of available primary regions may contain one or more available primary regions. The region management service 140 may obtain the list of available primary regions by receiving the list from the client. The region management service 140 may obtain the list of available primary regions by listing which regions from the list of regions satisfy each of the rules from the list of rules for the corresponding primary region. In some implementations, the region management service 140 may obtain the list of available primary regions corresponding to a previous list of available primary regions.

The routine 600 continues at block 608, where the region management service 140 must determine the list of unavailable primary regions for each primary region. The region management service 140 may obtain the list of unavailable primary regions by listing which regions from the list of regions do not satisfy one or more of the rules from the list of rules for the corresponding primary region. In some implementations, the region management service 140 may obtain the list of unavailable primary regions by listing which regions from the list of regions are not on the list of available primary regions. The region management service 140 must then determine one or more rule engines configured to operate on the one or more available primary regions. The one or more rule engines may include one or more of a remediation engine and a readiness engine. The remediation engine may be configured to remediate one or more unavailable primary regions such that the one or more unavailable primary regions satisfies each rule of the list of rules for a corresponding primary region. The readiness engine may be configured to ready the regional management service such that one or more of the unavailable primary regions is placed into an available position for one or more of the primary regions.

At decision block 610, a test is conducted to determine whether to update the list of available regions for each primary region. If so, at block 612, the respective list of available regions can be updated by primary regions that were previously indicated as unavailable but have been successfully remediated. In other embodiments, the list of updated available regions can be updated to remove previously available primary regions that were not successful in the readiness processing. At decision block 614, a test is conducted to determine whether to repeat the routine 600. As described above, the trigger event can correspond to timing information, manual selection or other established event, such as client input event, a decrease in capacity of a primary region, or any other event. The routine 600 can repeat to block 602.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing primary regions associated with applications, the system comprising:
   a data storage medium storing region designations; and
   one or more computer hardware processors for managing failover of an application that is partitioned across a plurality of isolated regions, the one or more computer hardware processors in communication with the data storage medium, wherein the one or more computer hardware processors are configured to execute computer-executable instructions to at least:
      obtain a list of a plurality of primary regions corresponding to the application, wherein individual regions of the plurality of primary regions correspond to a particular geographic location for hosting a partition of the application;
      for each individual primary region of the plurality of primary regions, obtain an individual primary region processing rule corresponding to the number of partitions of the application hosted by the particular individual primary region;
      process the individual primary region processing rule for each individual primary region to determine capacity requirements of the plurality of primary regions based on, for each individual primary region of the plurality of primary regions, obtaining the individual primary region processing rule; and
      perform remediation operations configured to increase capacity of at least one additional individual primary region in the plurality of primary regions responsive to the capacity requirements of the plurality of primary regions.

2. The system of claim 1, wherein the one or more computer hardware processors are configured to execute further computer-executable instructions to at least automatically perform the remediation operations.

3. The system of claim 1, wherein the one or more computer hardware processors are configured to execute further computer-executable instructions to at least:
   obtain one or more additional processing rules corresponding to the list of the plurality of primary regions, the one or more additional processing rules defining individual parameters and associated thresholds; and
   process the list of the plurality of primary regions to determine one or more available primary regions by applying the one or more additional processing rules to each of the plurality of primary regions.

4. The system of claim 1, wherein the one or more computer hardware processors are configured to execute further computer-executable instructions to at least perform the remediation operations based on variable increases in capacity for the plurality of primary regions.

5. A system for managing regions, the system comprising:
   a data storage medium storing region designations; and
   one or more computer hardware processors for managing failover of an application that is partitioned across a plurality of isolated regions, the one or more computer hardware processors in communication with the data storage medium, wherein the one or more computer hardware processors are configured to execute computer-executable instructions to at least:
      for the application, identify a list of primary regions, wherein individual regions of the primary regions correspond to a particular geographic location for hosting a partition of the application;
      obtain a plurality of processing rules, wherein each primary region of the list of primary regions corresponds to one or more processing rules of the plurality of processing rules;
      process the plurality of processing rules to determine capacity requirements for the list of primary regions based on application of the plurality of processing rules to the list of primary regions; and
      perform at least one rules engine operation configured to increase capacity of a particular primary region of the list of primary regions responsive to the capacity requirements for the list of primary regions.

6. The system of claim 5, wherein the one or more computer hardware processors are configured to execute further computer-executable instructions to at least characterize one or more primary regions of the list of primary regions as available based on application of one or more processing rules of the plurality of processing rules to the one or more primary regions.

7. The system of claim 6, wherein to perform the at least one rules engine operation, the one or more computer hardware processors are configured to execute further computer-executable instructions to at least remediate the one or more primary regions based on the capacity requirements.

8. The system of claim 5, wherein to perform the at least one rules engine operation, the one or more computer hardware processors are configured to execute further computer-executable instructions to at least remediate one or more primary regions from the list of primary regions based on a defined proximity of an event.

9. The system of claim 5, wherein to perform the at least one rules engine operation, the one or more computer hardware processors are configured to execute further computer-executable instructions to at least remediate one or more available primary regions from the list of primary regions, based at least in part on at least one of a failure rate, cost, availability, workload locality, infrastructure, or latency of the one or more available primary regions.

10. The system of claim 5, wherein at least one processing rule of the plurality of processing rules corresponds to capacity.

11. The system of claim 5, wherein at least one processing rule of the plurality of processing rules corresponds to error rates.

12. The system of claim 5, wherein at least one processing rule of the plurality of processing rules is generated by a client.

13. The system of claim 5, wherein the one or more computer hardware processors are configured to execute further computer-executable instructions to at least determine a regional capacity of one or more primary regions of the list of primary regions, wherein to perform the at least one rules engine operation, the one or more computer hardware processors are configured to execute further computer-executable instructions to at least remediate one or more primary regions from the list of primary regions, based at least in part on the plurality of processing rules and the regional capacity.

14. The system of claim 5, wherein the one or more computer hardware processors are configured to execute further computer-executable instructions to at least run at predetermined intervals.

15. The system of claim 5, wherein the one or more computer hardware processors are configured to execute further computer-executable instructions to at least run based at least in part on an occurrence of an event, wherein the event may be a client input event, a decrease in capacity of one of the primary regions of the list of primary regions, or any other event.

16. A computer-implemented method for managing failover of an application that is partitioned across a plurality of isolated regions, wherein the group of regions is comprised of a plurality of primary regions, the method comprising:

defining a list of a plurality of primary regions supporting the application, wherein individual regions of the plurality primary regions correspond to a particular geographic location for hosting a partition of the application;

identifying capacity requirements of the plurality of primary regions, wherein the capacity requirements are based at least in part on an application of processing rules defining a number of partitions of the application hosted by individual primary regions in the list of the plurality of primary regions;

determining one or more operations configured to increase capacity of a particular primary region of the plurality of primary regions responsive to the capacity requirements of the plurality of primary regions; and performing the one or more operations.

17. The method of claim 16, the method further comprising:

defining a list of unavailable primary regions, wherein the list of unavailable primary regions is based at least in part on the application of the processing rules;

generating a remediation recommendation, based upon defining the list of unavailable primary regions; and remediating one or more unavailable primary regions of the list of unavailable primary regions by performing a remediation operation, based at least in part on the remediation recommendation.

18. The method of claim 17 further comprising updating a list of a plurality of available primary regions responsive to the successful remediating of the one or more unavailable primary regions.

19. The method of claim 17, wherein determining the one or more operations comprises determining the list of the plurality of primary regions correspond to target criteria.

20. The method of claim 17, the method further comprising limiting capacity checks on the list of the plurality of primary regions.

* * * * *